UNITED STATES PATENT OFFICE.

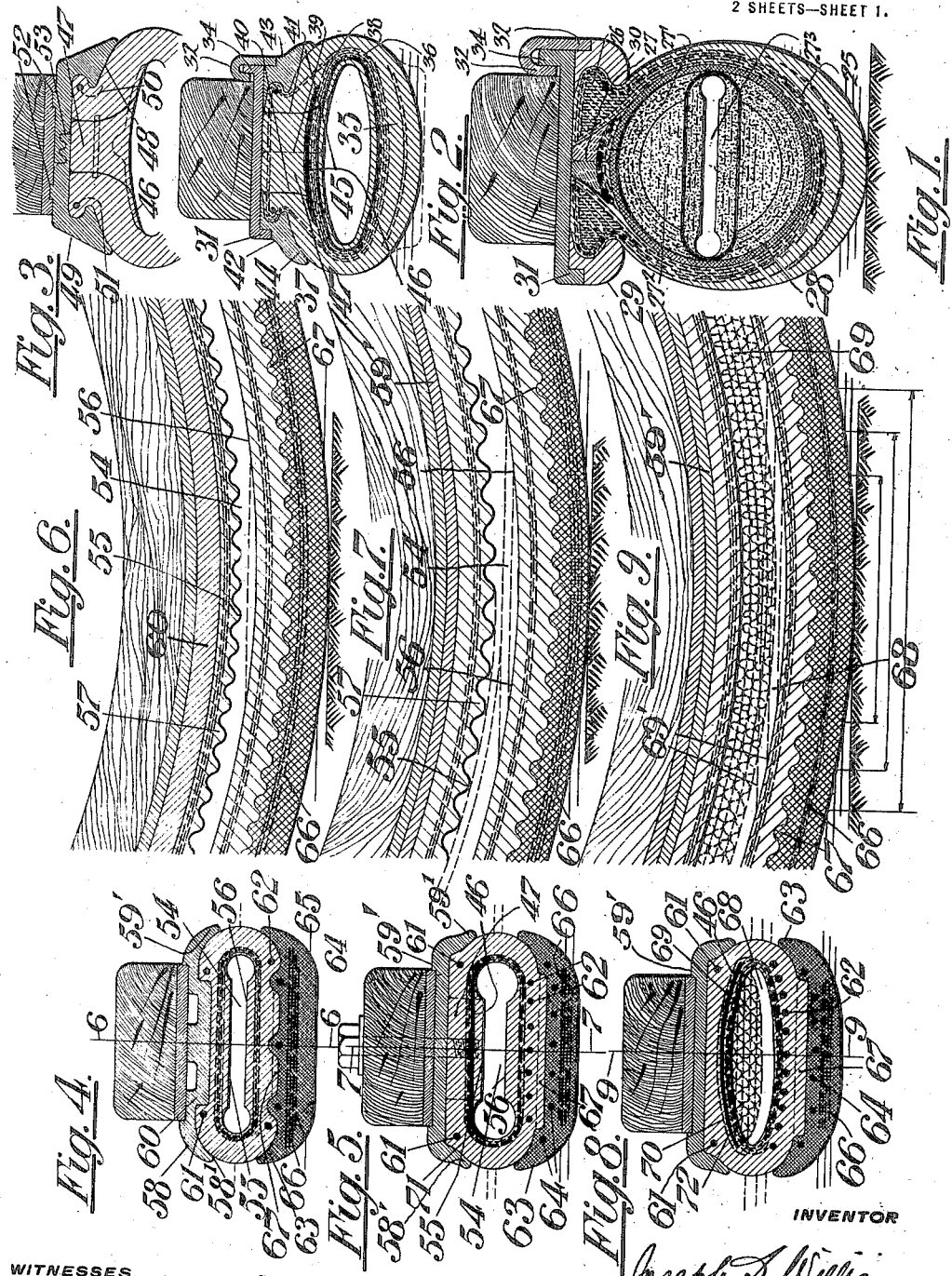

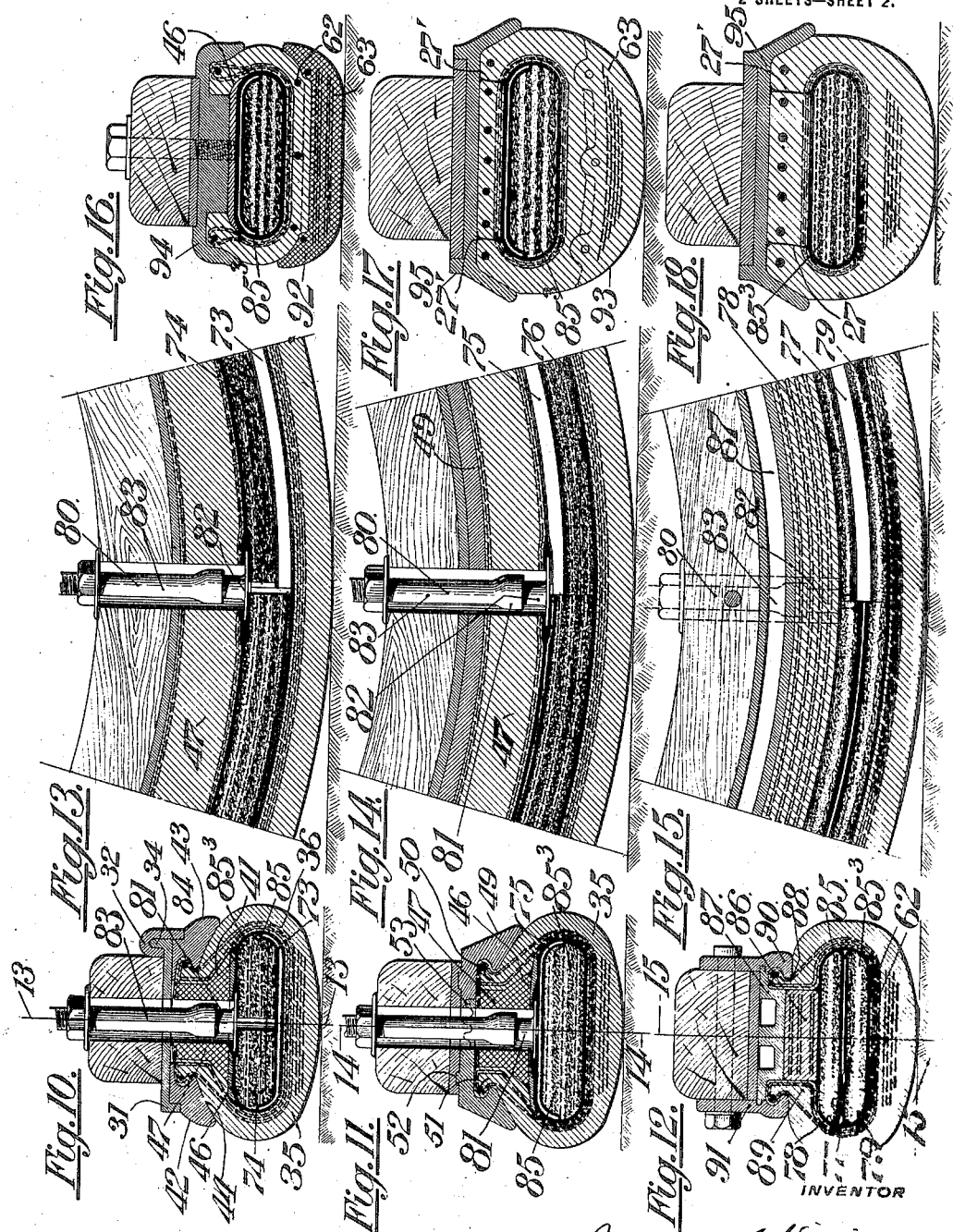

JOSEPH S. WILLIAMS, OF PHILADELPHIA, PENNSYLVANIA.

RESILIENT WHEEL EQUIPMENT.

1,290,453. Specification of Letters Patent. Patented Jan. 7, 1919.

Application filed December 8, 1909, Serial No. 532,043. Renewed May 27, 1918. Serial No. 236,927.

*To all whom it may concern:*

Be it known that I, JOSEPH S. WILLIAMS, a citizen of the United States, residing in Philadelphia, Philadelphia county, and State of Pennsylvania, have invented a new and useful Resilient Wheel Equipment.

One of the objects of my invention is to devise a resilient wheel equipment provided with a solid cushion content in which a mobile insert may be used, but in which, in the absence of the insert, the deflection under normal load corresponds substantially to that when the mobile insert is in place.

With the above and other objects in view which will more clearly appear in the detailed description, my invention consists of a novel resilient wheel equipment.

It further consists of other novel features of construction, all as will be hereinafter fully set forth.

For the purpose of illustrating my invention, I have shown herein certain embodiments thereof which in practice will give satisfactory and reliable results, although it is of course to be understood that the various instrumentalities of which my invention consists can be variously arranged and organized and my invention is not limited to the exact arrangement and organization of these instrumentalities as herein set forth.

Figure 1 represents a transverse section of a vehicle tire and rim embodying my invention.

Fig. 2 represents a transverse section of another embodiment of my invention.

Fig. 3 represents a transverse section of another embodiment of my invention.

Figs. 4 and 5 represent other embodiments of my invention having provision against excessive collapse.

Figs. 6 and 7 represent circumferential sections of the structures seen in Figs. 4 and 5 respectively upon lines 6—6 and 7—7 of these figures.

Fig. 8 represents a transverse section of another embodiment of my invention.

Fig. 9 represents a circumferential section upon line 9—9 of Fig. 8.

Figs. 10, 11 and 12 represent transverse sections of other embodiments of my invention.

Figs. 13, 14 and 15 represent circumferential sections of Figs. 10, 11 and 12 upon lines 13—13, 14—14 and 15—15, respectively.

Figs. 16, 17 and 18 represent transverse sections of other embodiments of my invention.

Similar numerals of reference indicate corresponding parts in the figures.

Referring to the drawings—

Referring first to Fig. 1, 25 designates a tire conforming in contour to the conventional tires now in use, but provided with circumferential gripping grooves and beads 26, divided at 27 to permit the insertion of an inner tube 28 and engaged by rings 29 and 30 to compress them within the space between the flanges 31 and 32 so that the tire seating parts will be compressed and firmly held to the rim independently of the inflation or deflation of the tire. The chamber of the tire formed by the outer part 25 is equipped with an annular member $27'$ and a compressible core $27^2$ arranged so as to cushion the load on the construction throughout the width of the core construction. $27^3$ designates a fluid pressure retainer which is transversely disposed and adapted to receive fluid, viscous, mobile, or elastic material under pressure so as to compress the member $27^2$ radially both inwardly and outwardly.

33 designates a rim member which engages the flange 34 to retain the parts in assembled position and the construction shown corresponds to the Marsh type of rim.

In the embodiment seen in Fig. 2, 35 designates a tread which is connected by the parts 36 and 37 with a backing 38, which latter may be divided as at 39, or may form an annular insert by dividing the same on the lines 40 and 41 so that the tire seating may be closed and securely clamped between the annular clamping members 42 and 43 which are preferably provided with extensions 44 and 45. The members 42 and 43 are retained in position by the flange 31, flange 34 and locking ring 32 in a similar manner to that shown in Fig. 1.

Referring now to the embodiment seen in Fig. 3, the construction is elliptical in cross section as in Fig. 2, and an annular reinforcing plate 46 is attached or fitted to an annular transversely divided ring 47, which can be inserted or withdrawn from position by opening the edges of the tire when the same is disengaged from the clamps 48 and 49 which hold such edges and seating under compression.

50 and 51 designate reinforcements which protect the edges and distribute the pressure. The members 48 and 49, in the present instance, have a tongue and groove connection 52 and engage with each other by interlocking parts 53.

Referring next to the embodiment seen in Figs. 4 to 7, inclusive, the construction is shown provided with a transversely elongated chamber 54 having relatively large radii of curvature at its extreme transverse limits and provided with cushions 55 and 56. Cushion 55 is made up of a plurality of transversely extending ribs 57. 58 and 59 designate transversely split rings which engage the tire within the channel formed by the flanges 58' and 59', respectively, and secured to and removed from the tire by springing the rings into place. The ring 58 has an outwardly extending part 60 engaging within a corresponding seating part on the inner face of the tire.

61 designates reinforcing members, and in the form shown in Figs. 5 and 7, an annular reinforcement 62 is arranged across the face of the tire to reinforce the tread against expansion and irregular depression and collapse in case of deflation, so that such portion is properly stiffened to maintain the same in engagement with a detachable tread 63 provided with stiffening members 64, which are also shown in Figs. 4 and 6. Within the tire annular grooves are provided which interlock with corresponding ribs and are held in place by an annular reinforcement 66.

67 designates corrugations which prevent creeping of the tread with respect to the tire.

In the embodiment seen in Figs. 8 and 9, a detachable tread 67 is provided with interlocking portions and reinforcements by means of annular binding strips, and I employ a combination of fluid, mobile, or elastic material 68 provided if desired with a filling 69 of cushioning material reinforced to any desired capacity. The cushioning member 69 and the chamber 68 have different depths on radial lines, as seen in Fig. 9. The lines 69' show the flattening of the tread in progressive stages of one-eighth to three-eighths of an inch, the latter representing a full flat tread three inches in width and about twenty-one inches of road contact with a mobile or elastic pressure of eighty pounds per square inch in the space 68, it being understood that the fluid pressure standard may vary as desired.

Annular bands 71 may be employed for supporting the tire in engagement with the rim attachment, as seen most clearly in Fig. 5.

The chamber which receives the fluid or mobile pressure may be inwardly or outwardly of the cushioning material, and in Figs. 10 and 13, this chamber is shown outwardly of the cushion 74, while in Figs. 11 and 14 the chamber 75 is inwardly of the elastic medium 76, and in Figs. 12 and 15 the chamber 77 is located between two layers of elastic medium 78 and 79. The walls of the chambers 73, 75 and 77 represent fluid tight inflatable members and under normal conditions, prior to inflation, the cushioning member closes the chamber almost entirely with provision being made for fluid or mobile material being forced therein, as will be clearly understood by reference to Figs. 8, 9, 13, 14 and 15 without further detailed description.

80 designates a conventional type of valve mechanism for the inflation and deflation of the inner tube and the valve tube is made, in the present instance, in two parts, joined at 81 so that the inner part 82 which carries the check valve and lies within the tire itself may be left in such position, while the extension 83 is removed when occasion arises for such removal.

In Figs. 10, 11 and 12, the construction of Figs. 13, 14 and 15 is shown in deflated condition, except that a slight showing of a chamber is made in each case, to point out the line of separation between the surfaces within which the fluid is located, while in Figs. 13, 14 and 15 the construction is shown under inflation. It will be seen that in accordance with my present invention the tread portion of the resilient body which forms the tire lies within a circle formed by the radius of one-half of the major transverse axis of the tire and in all the embodiments of my invention I provide an annular transversely elongated cushion which is wholly or partially surrounded by tensile reinforcements forming a tension belt extending transversely in flattened formation across the outer periphery of the cushion with curvatures at the sides and the seating parts of the tire which latter are secured near the inner support and rendered inextensible at such point. The tensile reinforcements serve to form the transversely elongated annular core space which is bisected by the major transverse axis of the tire. The core is of elastic material of solid nature and substantially fills the core space and is preferably provided with a space for clearance which may be filled with mobile material or flattened under pressure. By my construction substantially normal formation of the tire is maintained under load both with and without the use of fluid under pressure.

The compressible and resilient core is made up of a series of layers comprising the compressible core material proper 84 and intermediate layers 85, 85' and 85² of fiber, cotton or other suitable strengthening material, the idea being to stiffen and support the main compressible core material against torsion and lateral spreading. In Fig. 12

I also show reinforcing means 62 consisting of annular reinforcing elements. The filler member 86 in Fig. 12 may be secured to or independent of the annular ring 87 and forms a filler between the extremities 88 and 89 of the tire, and the split ring 87 performs a similar function since one or both of the members 86 and 87 afford a circumferential grip against which the extremities 88 and 89 may be clamped in any desired manner. 90 and 91 designate clamping rings which exert compressive strain on the extremities 88 and 89, while the split ring 87 distends the member 86 and the tire and compresses the seating thereof.

In the embodiment seen in Figs. 16 and 17, the shoes 92 and 93 are both removable. The annular tire seating and demountable members 94 and 95 are transversely split to provide for expansion on the rim. In the embodiments shown in Figs. 16 to 18, I have shown stratifications $85^3$ to provide for transverse support of the resilient material of the core.

The embodiments seen in Figs. 17 and 18 may if desired be divided on lines 27' so that the cushioning core may be inserted and removed. A member 95 can be provided having an outward projection seating on the member 46, seen in Fig. 16, and united therewith by radial bolts shown so that such parts are firmly gripped and held under compression.

My invention provides an annular tire construction of various widths with flat, or relatively flat cushioning support in transverse section composed of resilient solid material having definite standards of radial compressibility, with or without mobile material, and located within circumferentially inextensible outer parts, so that a practically uniform area of distributed support will be obtained. The transversely arranged cushioning parts maintain substantially constant wheel diameter, with or without fluid content, and the fluid content is employed to secure uniform distributive support and uniformity of compressive strains within a radial range not greatly exceeding a depth of normal tread deflection.

My construction is preferably inextensible in both the rim belt and the outer belt of the construction. The belt of relatively soft cushioning material between the inextensible fields thus formed provides a substantially constant standard of resilient support for the load to be carried with a range of resilient altitude of approximately three-eighths of an inch which fully equals the distributive tread support along the planes of road contact and the altitude of resiliency which is obtained with the ordinary pneumatic tires. The transversely disposed belt of fluid content in the transverse planes of the construction between the inner and outer inextensible belts serves to equalize the strain and support the load to any desired degree, thereby enabling me to provide the maximum area of resilient support and relatively low internal resistance.

It will now be apparent that I have devised a novel and useful resilient wheel equipment which embodies the features of advantage enumerated as desirable in the statement of the invention and the foregoing description, but it is to be understood that various changes may be made and still be within the spirit and scope of my invention.

Having thus described my invention, what I claim as new and desire to secure by Letters Patent, is:—

1. A tire, comprising an annular transversely elongated resilient body having an annular transversely elongated cushion with fluid under pressure in it, the volume of solid material of the cushion exceeding the volume of the fluid under pressure, a tension belt confining the outer periphery and sides of the cushion and having its outer periphery in flattened arch formation, and an annular support connected with the seating parts of the tension belt.

2. A tire, comprising an annular transversely elongated body having an annular elastic cushion of solid material transversely elongated and substantially equally distributed on opposite sides of the major transverse axis of the body and provided with an annular transversely elongated space, an annular transversely elongated tension belt in flattened formation at its outer periphery and extending with curvatures at its sides around the sides of the cushion, and means to render the seating parts of the body circumferentially inextensible.

3. A tire, comprising an annular transversely elongated body having an annular elastic cushion of layers of fabric and rubber transversely elongated and substantially equally distributed on opposite sides of the major transverse axis of the body and provided with an annular transversely elongated space, an annular transversely elongated circumferentially inextensible tension belt in flattened formation at its outer periphery and extending with curvatures at its sides around the sides of the cushion, and means to render the seating parts of the body circumferentially inextensible.

4. A resilient tire, comprising an inner support, an annular and transversely elongated tension belt having flattened formation in spaced relationship about said support, and a yielding flexible cushion between said support and tension belt, said tension belt and cushion providing definite ranges of resilient movements and non-collapsible resilient support under load about said inner support and ranges of resilient movements radially of approximately three-eighths of an inch altitude of tread deflection along the plane of road.

5. A resilient tire, comprising an inner support, an annular and transversely elongated tension belt having flattened formation in spaced relationship about said support with curvatures about the sides to said inner support, and a yielding flexible cushion, said tension belt and cushion providing definite ranges of resilient movements and non-collapsible resilient support under load about said inner support and ranges of resilient movements radially of approximately three-eighths of an inch altitude of tread deflection along the plane of road.

6. A resilient tire, comprising an inner support, an annular and transversely elongated tension belt having flattened formation in spaced relationship about said support, and a yielding flexible cushion between said support and tension belt, said tension belt and cushion providing definite ranges of resilient movements and non-collapsible resilient support under load about said inner support and ranges of resilient movements radially of approximately three-eighths of an inch altitude of tread deflection along the plane of road, and means to vary the tension of said support and cushion about said support.

7. A resilient tire, comprising an inner support, an annular and transversely elongated tension belt having flattened formation in spaced relationship about said support, and a yielding flexible cushion between said support and tension belt, said tension belt and cushion providing definite ranges of resilient movements and non-collapsible resilient support under load about said inner support and ranges of resilient movements radially of approximately three-eighths of an inch altitude of tread deflection along the plane of road, and means in said tire between said support and belt to receive and confine mobile contents under pressure.

8. A tire, comprising an annular, transversely elongated resilient body having its tread portion lying within a circle formed by a radius of one-half the major transverse axis of the tire, and having tensile reinforcements located on opposite sides of such axis and extending transversely of the tire in flattened formation across the median line with curvatures at the sides extending to inner peripheral seating parts, in combination with yielding flexible means to support, with or without inflation, the tensile reinforcements and tread in resilient, spaced, and non-collapsible load supporting relationship about said seating parts.

9. A tire, comprising an annular, transversely elongated resilient body having its tread portion lying within a circle formed by a radius of one-half the major transverse axis of the tire, and having tensile reinforcements located on opposite sides of such axis and extending transversely of the tire in flattened formation across the median line with curvatures at the sides extending to inner peripheral seating parts, in combination with yielding flexible means to support, with or without inflation, the tensile reinforcements and tread in resilient, spaced, and non-collapsible load supporting relationship about said seating parts and so as to provide definite ranges of resilient movements radially and along the plane of road contact of the tire.

10. A resilient tire, comprising an inner support, an annularly and transversely disposed tension belt, a tread outwardly of said tension belt in spaced relationship about said support, a yielding, flexible cushion, a fluid-tight portion providing clearance space for resilient movements of said belt and cushion, and mobile contents under pressure in said space, said tension belt and cushion providing non-collapsible resilient support and definite ranges of resilient movements about said inner support and along the plane of road contact with slight variations in ranges of resilient altitude with and without mobile contents under pressure.

11. A resilient tire, comprising an inner support, an annularly and transversely disposed tension belt extending with curvatures about the sides to said inner support, a tread outwardly of said tension belt in spaced relationship about said support, a yielding, flexible cushion, a fluid-tight portion providing clearance space for resilient movements of said belt and cushion, and mobile contents under pressure in said space, said tension belt and cushion providing non-collapsible resilient support and definite ranges of resilient movements about said inner support and along the plane of road contact with slight variations in ranges of resilient altitude with and without mobile contents under pressure.

12. A tire, comprising an inner support, an annular and transversely disposed tension member with curvatures about the sides to said inner support, and means to maintain said member in tension and in spaced non-collapsible relationship about said support and to provide definite ranges of resilient flexing of said member under load.

JOSEPH S. WILLIAMS.

Witnesses:
H. S. FAIRBANKS,
C. D. McVAY.